(12) United States Patent
Iguchi

(10) Patent No.: US 11,114,244 B2
(45) Date of Patent: *Sep. 7, 2021

(54) DIELECTRIC COMPOSITION AND ELECTRONIC COMPONENT

(71) Applicant: TDK CORPORATION, Tokyo (JP)

(72) Inventor: Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 16/783,209

(22) Filed: Feb. 6, 2020

(65) Prior Publication Data
US 2020/0303122 A1  Sep. 24, 2020

(30) Foreign Application Priority Data

Mar. 22, 2019 (JP) .............................. JP2019-055407

(51) Int. Cl.
*H01G 4/12* (2006.01)
*C04B 35/495* (2006.01)
(Continued)

(52) U.S. Cl.
CPC ......... *H01G 4/1263* (2013.01); *C04B 35/495* (2013.01); *C04B 35/6262* (2013.01); *C04B 35/62675* (2013.01); *C04B 35/63416* (2013.01); *C04B 35/64* (2013.01); *H01G 4/30* (2013.01); *C04B 2235/3236* (2013.01); *C04B 2235/3248* (2013.01); *C04B 2235/3249* (2013.01); *C04B 2235/3255* (2013.01); *C04B 2235/604* (2013.01); *C04B 2235/606* (2013.01); *C04B 2235/6562* (2013.01); *C04B 2235/6567* (2013.01); *C04B 2235/6582* (2013.01); *H01G 4/232* (2013.01); *H01G 4/248* (2013.01)

(58) Field of Classification Search
CPC ... C04B 35/495; H01G 4/1236; H01G 4/1254
See application file for complete search history.

(56) References Cited

U.S. PATENT DOCUMENTS 10,354,799 B2 *  7/2019  Nomura .................... H01G 4/30
10,513,464 B2 * 12/2019  Akiba ....................... H01B 3/12
(Continued)

FOREIGN PATENT DOCUMENTS

JP  H03-274607 A  12/1991

*Primary Examiner* — Karl E Group
(74) *Attorney, Agent, or Firm* — Oliff PLC

(57) ABSTRACT

Provided is a dielectric composition which includes, as a main component, a complex oxide represented by a general formula $A_aB_bC_4O_{15+\alpha}$ and having a tungsten bronze structure, wherein "A" includes at least Ba, "B" includes at least Zr, "C" includes at least Nb, "a" is 3.05 or higher, and "b" is 1.01 or higher. In the dielectric composition, when the total number of atoms occupying M2 sites in the tungsten bronze structure is set to 1, the proportion of "B" is 0.250 or higher. In addition, in the dielectric composition, an X-ray diffraction peak of a (410) plane of the tungsten bronze structure is splitted into two, and an integrated intensity ratio of an integrated intensity of a high-angle side peak of the X-ray diffraction peak with respect to an integrated intensity of a low-angle side peak of the X-ray diffraction peak is 0.125 or higher.

12 Claims, 4 Drawing Sheets

(51) Int. Cl.
C04B 35/626 (2006.01)
C04B 35/634 (2006.01)
C04B 35/64 (2006.01)
H01G 4/30 (2006.01)
H01G 4/232 (2006.01)
H01G 4/248 (2006.01)

(56) References Cited

U.S. PATENT DOCUMENTS

| | | |
|---|---|---|
| 10,964,477 B2 * | 3/2021 | Iguchi ............... C04B 35/63416 |
| 10,991,511 B2 * | 4/2021 | Iguchi ..................... C04B 35/64 |
| 2020/0090869 A1 * | 3/2020 | Iguchi .............. C04B 35/62685 |
| 2020/0303122 A1 * | 9/2020 | Iguchi ..................... C04B 35/64 |

* cited by examiner

DIELECTRIC COMPOSITION AND ELECTRONIC COMPONENT

BACKGROUND OF THE INVENTION

Field of the Invention

The present invention relates to a dielectric composition and an electronic component including a dielectric layer configured by the dielectric composition.

Description of the Related Art

In an electronic circuit or a power supply circuit incorporated in an electronic device, a large number of electronic components such as a multilayer ceramic capacitor which utilizes dielectric characteristics expressed by a dielectric are mounted. As a material configuring the dielectric of the above electronic component (a dielectric material), a barium titanate-based dielectric composition is widely used.

However, in recent years, the application of electronic components has been expanded, and for example, the electronic components are required to function sufficiently even under a high temperature or high voltage environment. However, under this environment, the dielectric characteristics of the barium titanate-based dielectric composition deteriorate, and the barium titanate-based dielectric composition cannot sufficiently cope with the environment. Therefore, a dielectric composition which can exhibit high dielectric characteristics even in this application is required.

In Patent Document 1, a dielectric composition obtained by substituting a part of Ba, Ti, and Nb with other elements in a ferroelectric material represented by a general formula $Ba_6Ti_2Nb_8O_{30}$ is disclosed as a dielectric composition other than the barium titanate-based dielectric composition.

Patent Document 1: Japanese Patent Laid-Open No. 3-274607

SUMMARY OF THE INVENTION

For a dielectric material, high dielectric characteristics (for example, a high relative permittivity) are required. The dielectric characteristics are characteristics based on the premise that the dielectric material is an insulator. Thus, the dielectric material is required to have a high resistivity so that the dielectric composition does not become a semiconductor or a conductor.

The present invention is completed in view of the aforementioned situation, and aims to provide a dielectric composition which can improve a relative permittivity while maintaining resistivity, and an electronic component including dielectric layers configured by the dielectric composition.

In order to achieve the above object, the dielectric composition of the present invention is

[1] a dielectric composition including a complex oxide represented by a general formula $A_aB_bC_4O_{15+\alpha}$ as a main component, wherein "A" includes at least barium, "B" includes at least zirconium, and "C" includes at least niobium;

"a" is 3.05 or higher, and "b" is 1.01 or higher;

the complex oxide has a tungsten bronze structure; and in the tungsten bronze structure, when the total number of atoms occupying M2 sites is set to 1, the proportion of "B" is 0.250 or higher.

[2] The dielectric composition according to [1], wherein the proportion of "B" is 0.400 or higher.

[3] A dielectric composition including a complex oxide represented by a general formula $A_aB_bC_4O_{15+\alpha}$ as a main component, wherein "A" includes at least barium, "B" includes at least zirconium, and "C" includes at least niobium;

"a" is 3.05 or higher, and "b" is 1.01 or higher;

the complex oxide has a tungsten bronze structure; and an X-ray diffraction peak of a (410) plane of the tungsten bronze structure is splitted into two, and an integrated intensity ratio of an integrated intensity of a high-angle side peak of the X-ray diffraction peak with respect to an integrated intensity of a low-angle side peak of the X-ray diffraction peak is 0.125 or higher.

[4] The dielectric composition according to [3], wherein the integrated intensity ratio is 0.200 or higher.

[5] The dielectric composition according to any one of [1] to [4], wherein the general formula is represented by $(Ba_{1-x}A1_x)_a(Zr_{1-y}B1_y)_b(Nb_{1-z}C1_z)_4O_{15+\alpha}$;

"A1" includes one or more elements selected from the group consisting of calcium and strontium, "B1" includes titanium, and "C1" includes tantalum; and "x" is 0.50 or lower, "y" is 0.25 or lower, and "z" is 0.50 or lower.

[6] The dielectric composition according to any one of [1] to [5], wherein "a" is 3.10 or higher.

[7] The dielectric composition according to any one of [1] to [6], wherein "b" is 1.05 or higher.

[8] An electronic component including a dielectric layer containing the dielectric composition according to any one of [1] to [7], and an electrode layer.

According to the present invention, a dielectric composition which can improve the relative permittivity while maintaining resistivity, and an electronic component including dielectric layers configured by the dielectric composition can be provided.

DETAILED DESCRIPTION OF THE INVENTION

Figure 1:
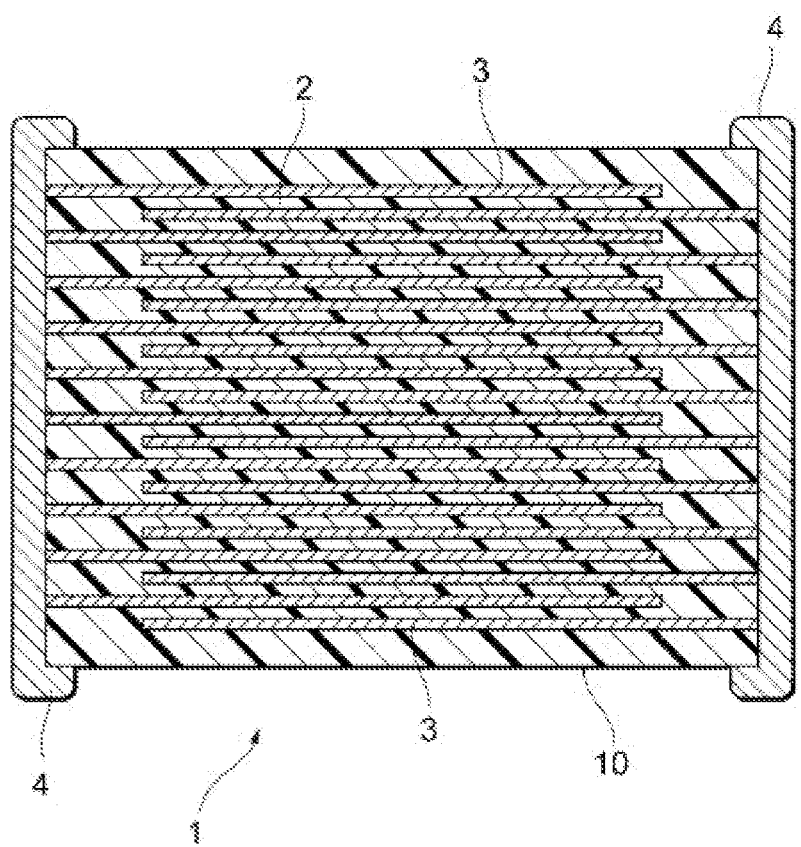
FIG. 1 is a cross-sectional view of a multilayer ceramic capacitor according to an embodiment of the present invention.

The present invention is described below in detail in the following order based on specific embodiments.

1. Multilayer ceramic capacitor
1.1 Overall configuration of multilayer ceramic capacitor
1.2 Dielectric layer
1.3 Internal electrode layer
1.4 External electrode
2. Dielectric composition
2.1 Complex oxide 3. Manufacturing method of multilayer ceramic capacitor
4. Summary of the embodiment
5. Modification example

1. Multilayer Ceramic Capacitor (1.1 Overall Configuration of Multilayer Ceramic Capacitor)

A multilayer ceramic capacitor 1 as an example of an electronic component according to the present embodiment is shown in FIG. 1. The multilayer ceramic capacitor 1 includes an element body 10 having a configuration in which dielectric layers 2 and internal electrode layers 3 are alternately stacked. At both ends of the element body 10, a pair of external electrodes 4 is formed which is electrically connected to each of the internal electrode layers 3 arranged alternately inside the element body 10. A shape of the element body 10 is not particularly limited and is usually a rectangular parallelepiped shape. In addition, a dimension of the element body 10 is not particularly limited and may be an appropriate dimension according to the application.

(1.2 Dielectric Layer)

The dielectric layer 2 is configured by a dielectric composition according to the embodiment described later. The thickness of each of the dielectric layers 2 (an interlayer thickness) is not particularly limited and can be arbitrarily set according to desired characteristics, the application or the like. Usually, the interlayer thickness is preferably 100 μm or less, and more preferably 30 μm or less. In addition, the number of stacked dielectric layers 2 is not particularly limited, and is preferably, for example, 20 or more in the embodiment.

(1.3 Internal Electrode Layer)

In the embodiment, the internal electrode layers 3 are stacked in a manner that each end face is alternately exposed on surfaces of the two opposite ends of the element body 10.

A conductive material contained in the internal electrode layer 3 is not particularly limited. The conductive material may be a base metal or a noble metal. The base metal is not particularly limited, and for example, a known conductive material such as Ni, Ni-based alloy, Cu, Cu-based alloy and the like may be used. Moreover, in Ni, Ni-based alloy, Cu, or Cu-based alloy, various trace components such as P and the like may be contained in an amount of about 1 mass % or less. The noble metal is not particularly limited, and a known conductive material such as Pd, Pt, Ag—Pd alloy and the like may be used. In addition, the internal electrode layer 3 may be formed using a commercially available electrode paste. The thickness of the internal electrode layer 3 may be suitably determined according to the application.

(1.4 External Electrode)

A conductive material contained in the external electrode 4 is not particularly limited. For example, a known conductive material such as Ni, Cu, Sn, Ag, Pd, Pt, Au, an alloy thereof, a conductive resin or the like may be used. The thickness of the external electrode 4 may be suitably determined according to the application.

2. Dielectric Composition

The dielectric composition according to the embodiment includes, as a main component, a complex oxide containing at least barium (Ba), zirconium (Zr) and niobium (Nb). That is, in the embodiment, the complex oxide is contained in an amount of 80 mass % or more and preferably 90 mass % or more in 100 mass % of the dielectric composition according to the embodiment.

(2.1 Complex Oxide)

Figure 2:
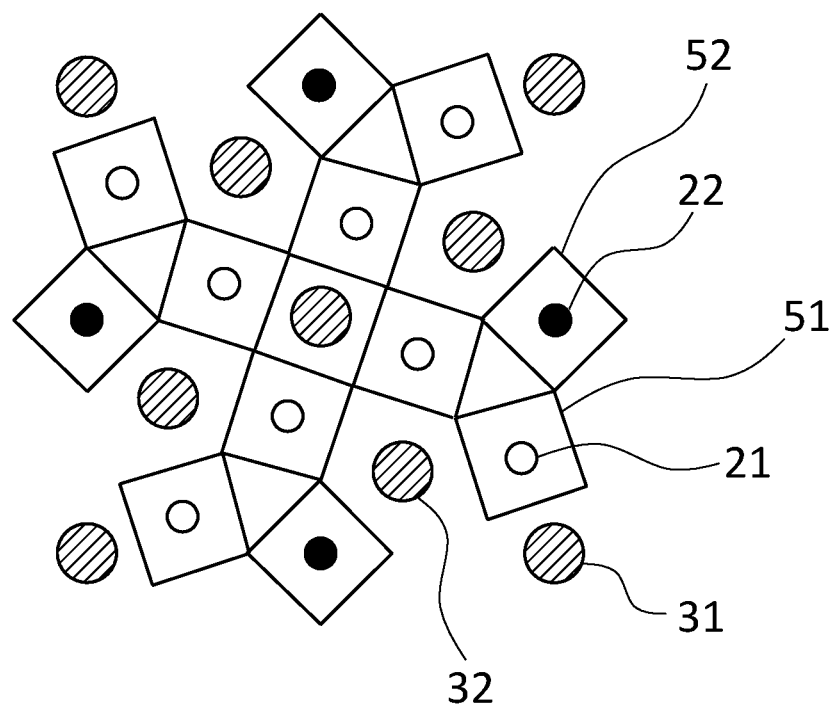
FIG. 2 is a schematic diagram showing a tungsten bronze structure viewed from a c-axis direction.

The complex oxide has a tungsten bronze structure. Specifically, the complex oxide has a tungsten bronze structure with a space group P4$bm$. FIG. 2 shows the tungsten bronze structure viewed from a c-axis direction. As shown in FIG. 2, in the tungsten bronze structure, a three-dimensional network is formed in which an oxygen octahedron 51 formed by coordinating six oxygen atoms to an element occupying an M1 site 21 shares vertices with an oxygen octahedron 52 formed by coordinating six oxygen atoms to an element occupying an M2 site 22. Furthermore, elements occupying an A1 site 31 and an A2 site 32 are located in an interstice between the oxygen octahedrons.

In addition, the complex oxide is represented by a general formula $A_aB_bC_4O_{15+\alpha}$. In the general formula, "A", "B" and "C" are divided based on a valence. That is, elements other than oxygen contained in the complex oxide are divided into three element groups ("A", "B", and "C") based on the valence. "A" is divalent elements and includes barium. "B" is tetravalent elements and includes zirconium. "C" is pentavalent elements and includes niobium.

In the embodiment, "A" occupies A1 sites and A2 sites in the tungsten bronze structure, and "B" and "C" occupy the M1 sites and the M2 sites.

As an example of $A_aB_bC_4O_{15+\alpha}$, Table 1 shows atomic coordinates when zirconium and niobium occupy the M1 sites and M2 sites of $Ba_3ZrNb_4O_{15}$ at the same ratio. The atomic coordinates shown in Table 1 comes from the Inorganic Material Database "AtomWork" of National Institute for Materials Science, [searched on Mar. 11, 2019], the Internet URL: http://crystdb.nims.go.jp/.

TABLE 1

| | | | | | | | | | |
|---|---|---|---|---|---|---|---|---|---|
| | | | | | Atom coordinates | | | | |
| Site No | Site notation | Atom | Multiplicity | Wyckoff | Site symmetry | x | y | z | Occupancy |
| 1 | Ba1 | Ba | 4 | h | m . . . 2m | 0.6717 | 0.1717 | 1/2 | 1 |
| 2 | Ba2 | Ba | 2 | b | 4/m. . . | 0 | 0 | 1/2 | 1 |
| 3 | M1 | 0.800Nb + 0.200Zr | 8 | i | m . . . | 0.20701 | 0.07565 | 0 | 1 |
| 4 | M2 | 0.800Nb + 0.200Zr | 2 | d | m . . . mm | 0 | 1/2 | 0 | 1 |
| 5 | O1 | O | 8 | j | m . . . | 0.2065 | 0.0762 | 1/2 | 1 |
| 6 | O2 | O | 8 | i | m . . . | 0.0001 | 0.3451 | 0 | 1 |
| 7 | O3 | O | 8 | i | m . . . | 0.0689 | 0.143 | 0 | 1 |
| 8 | O4 | O | 4 | g | m . . . 2m | 0.2109 | 0.7109 | 0 | 1 |
| 9 | O5 | O | 2 | c | m . . . mm | 0 | 1/2 | 1/2 | 1 |

In Table 1, "Ba1" and "Ba2" are represented as A1 site and A2 site respectively in this specification.

As shown in FIG. 2, the oxygen octahedron 51 centered on the M1 site is slightly distorted compared with the oxygen octahedron 52 centered on the M2 site. Dielectric characteristics (for example, the relative permittivity) are improved due to this distortion, and if "C" occupies the M1 sites, distortion becomes larger, which is preferable.

On the other hand, the inventor found that of "B" and "C", "B" is easy to occupy the M1 sites. Furthermore, when "B" occupies the M1 sites, even if an electric field is applied to the complex oxide, "B" having a small valence is difficult to move and polarization is small. On the other hand, when "C" occupies the M1 sites, the valence is larger than that of "B", and thus if an electric field is applied, "C" is easy to move and polarization is large.

That is, the inventor found that the smaller the ratio of "B" in the M1 sites, the more the dielectric characteristics due to polarization improved. Conversely, the larger the ratio of "B" in the M2 sites, the more the dielectric characteristics improved.

Therefore, in the embodiment, the ratio of "B" in the M2 sites is set to a predetermined value or higher. Specifically, when the total number of atoms occupying the M2 sites is set to 1, the proportion of "B" is 0.250 or higher. The proportion of "B" is preferably 0.400 or higher and more preferably, 0.500 or higher.

By setting the ratio of "B" in the M2 sites within the above range, the relative permittivity tends to be improved as compared with the case in which the ratio of "B" in the M2 sites is low.

In addition, the inventor found that the dielectric characteristics (for example, the relative permittivity) are improved by controlling the shape of the X-ray diffraction peak of a (410) plane of the tungsten bronze structure. Specifically, the dielectric characteristics are improved by splitting the X-ray diffraction peak of the (410) plane into two and making a high-angle side peak relatively large with respect to a low-angle side peak. Note that, the X-ray diffraction peak of the (410) plane of the tungsten bronze structure is usually the second strongest peak, and appears within a range of 28° to 29.5° of a diffraction angle (2θ) in an X-ray diffraction measurement using Cu—Kα ray as an X-ray source.

In the embodiment, an integrated intensity (an area) of the low-angle side peak and an integrated intensity (an area) of the high-angle side peak are calculated, and a ratio (an integrated intensity ratio) of the integrated intensity of the high-angle side peak with respect to the integrated intensity of the low-angle side peak is calculated. As the integrated intensity ratio increases, the relative permittivity tends to improve. In the embodiment, the integrated intensity ratio is 0.125 or higher. The integrated intensity ratio is preferably 0.200 or higher, and more preferably 0.250 or higher.

When the diffraction peak of the (410) plane is splitted into two, the tail of the low-angle side peak and the tail of the high-angle side peak usually overlap, and the integrated intensity (the area) of each peak is difficult to calculate. Therefore, in order to calculate the integrated intensity of each peak, in the embodiment, the diffraction peak of the (410) plane is separated using a sum of two Voigt functions.

The Voigt function is a distribution function obtained by convolution of a Gaussian function and a Lorentz function and is used to approximate an X-ray diffraction peak, a spectral spectrum, and the like. By fitting in a manner that a square error of experimental data of the diffraction peak of the (410) plane and a sum of two Voigt functions is minimized, the diffraction peak of the (410) plane is represented as a composite peak of two peaks (the low-angle side peak and the high-angle side peak).

In the embodiment, parameters and magnifications of respective Voigt functions are optimized to minimize the square error of the sum of the two Voigt functions and the experimental data. Any optimization solver can be used for the optimization. The Voigt functions can be calculated by known software. In addition, a known algorithm or software can be used for the optimization solver.

Figure 3A:
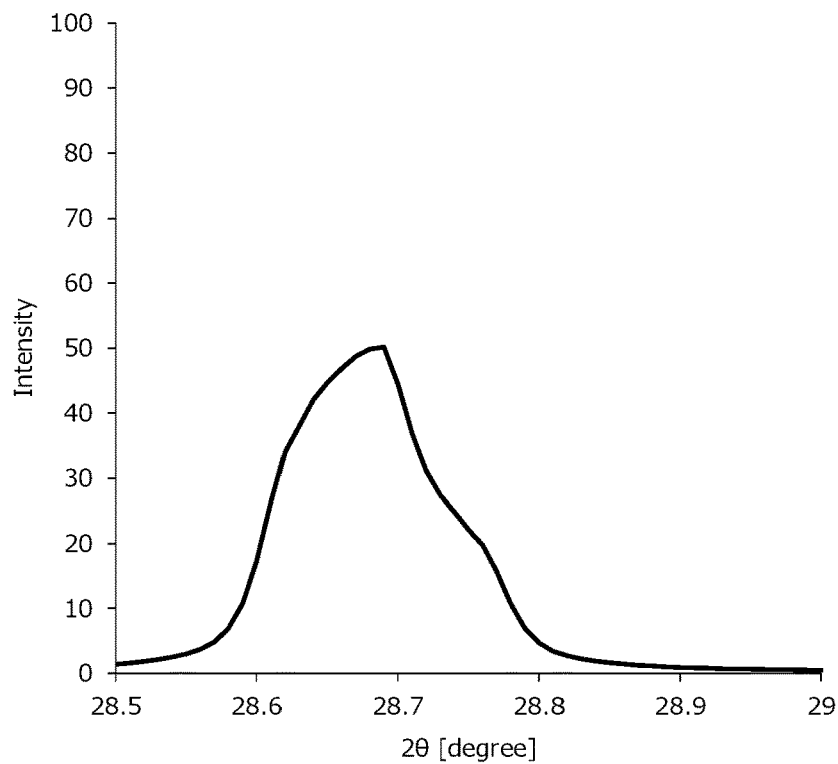
FIG. 3A and FIG. 3B are diagrams showing X-ray diffraction peaks of a (410) plane of the tungsten bronze structure.
Figure 3B:
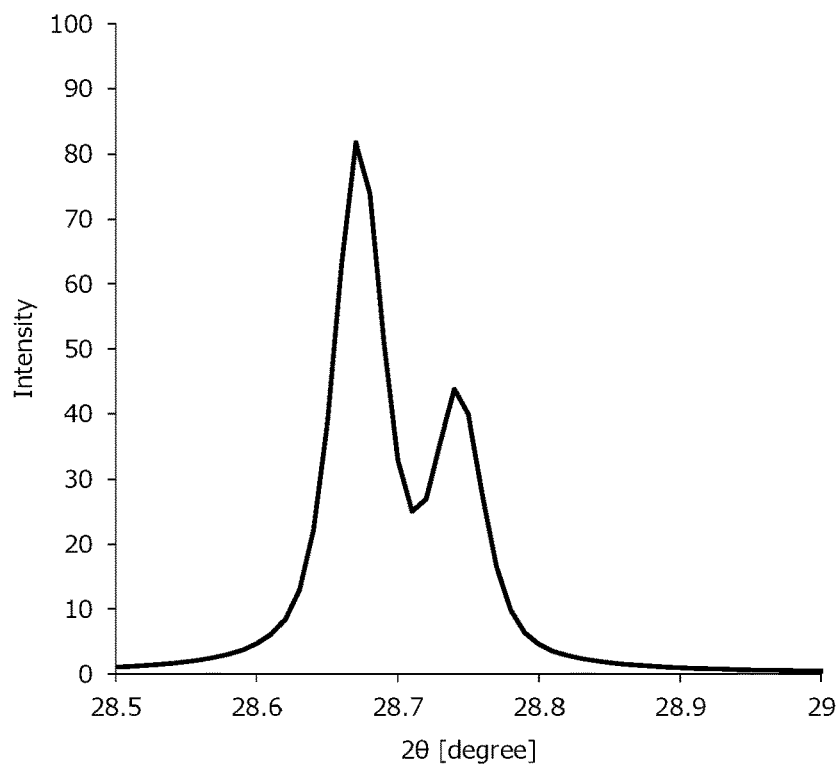
Figure 4A:
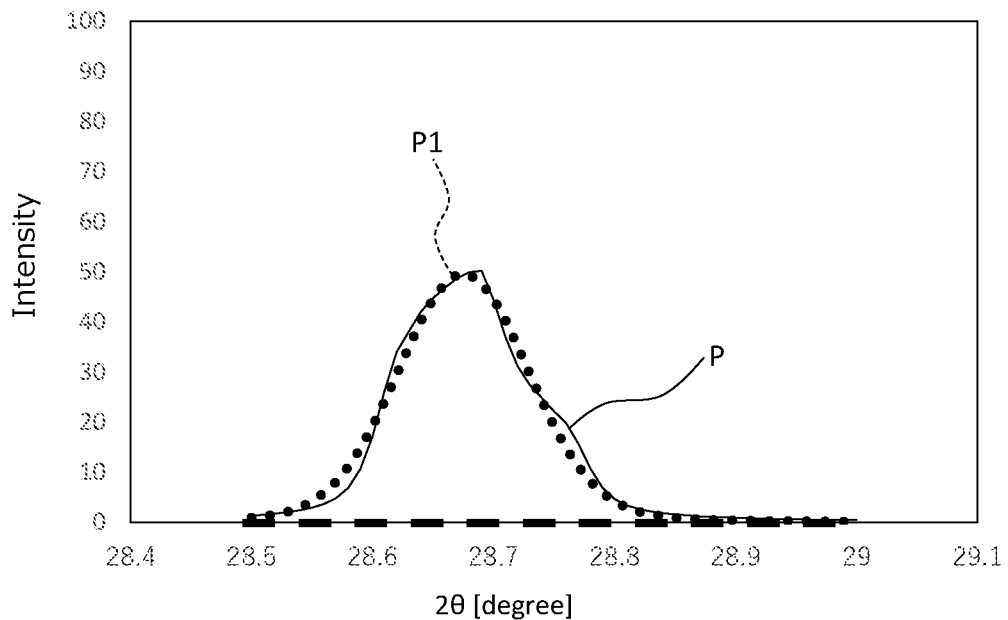
FIG. 4A is a diagram showing a result of separating the X-ray diffraction peak of the (410) plane shown in FIG. 3A into two peaks by a Voigt function.
Figure 4B:
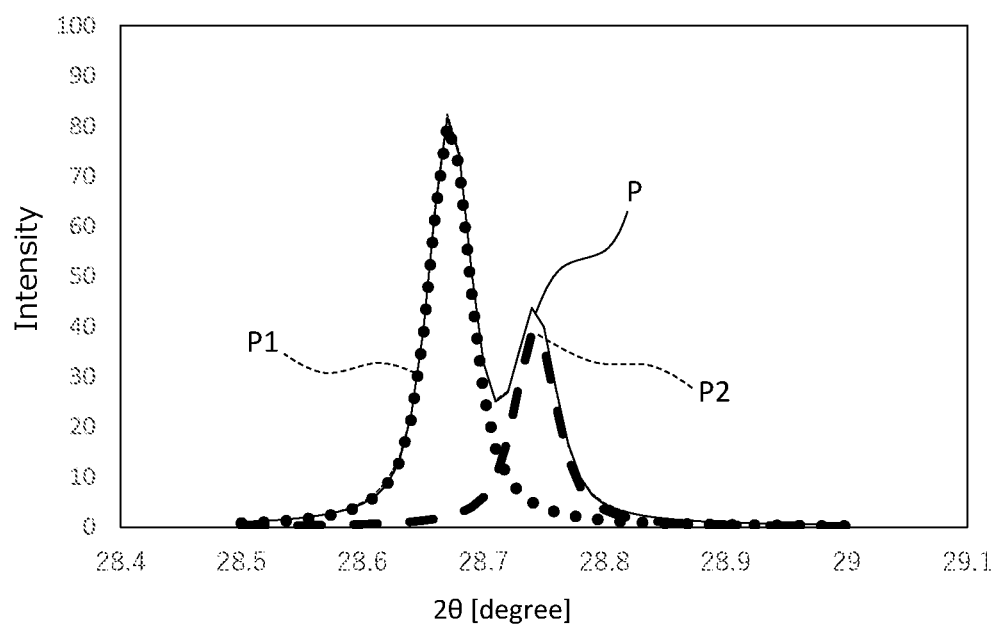
FIG. 4B is a diagram showing a result of separating the X-ray diffraction peak of the (410) plane shown in FIG. 3B into two peaks by a Voigt function.

FIG. 3A shows an X-ray diffraction chart in which a X-ray diffraction peak of the (410) plane is a single peak, and FIG. 3B shows an X-ray diffraction chart in which an X-ray diffraction peak of the (410) plane is splitted into two. FIG. 4A and FIG. 4B respectively show results of separating the X-ray diffraction peak of the (410) plane shown in FIG. 3A and FIG. 3B into two diffraction peaks by the Voigt functions.

As shown in FIG. 4B, the X-ray diffraction peak of the (410) plane P can be separated into the low-angle side peak P1 and the high-angle side peak P2 using the Voigt functions. Then, the integrated intensity of the low-angle side peak P1 and the integrated intensity of the high-angle side peak P2 are calculated, and the integrated intensity ratio (the integrated intensity of the high-angle side peak P2/the integrated intensity of the low-angle side peak P1) can be calculated. Moreover, as is clear from FIG. 4A, when a diffraction peak of the (410) plane P is a single peak, the diffraction peak of the (410) plane P is configure only by the low-angle side peak P1. Therefore, the integrated intensity ratio is zero.

The inventor found that the integrated intensity ratio and the ratio of "B" in the M2 sites are correlated. That is, the splitting of the diffraction peak of the (410) plane correlates with the ratio of "B" in the M2 sites. Specifically, a relationship that the ratio of "B" in the M2 sites=the integrated intensity ratio×2 is established. That is, the ratio of "B" in the M2 sites can be calculated from the integrated intensity ratio.

As described above, the complex oxide is represented by the general formula $A_aB_bC_4O_{15+\alpha}$. "a" in the above general formula represents the proportion of the number of atoms of "A" when four atoms of the element constituting "C" are included in the general formula, and "b" in the above general formula represents the proportion of the number of atoms of "B" when four atoms of the element constituting "C" are included in the general formula.

In the embodiment, "a" is preferably 3.05 or higher, and preferably 3.10 or higher. An upper limit of "a" is not limited as long as the effects of the present invention can be obtained, and for example, the upper limit is preferably 3.50 or lower, and more preferably 3.30 or lower.

In addition, in the embodiment, "b" is preferably 1.01 or higher, and preferably 1.05 or higher. An upper limit of "b" is not limited as long as the effects of the present invention can be obtained, and for example, the upper limit is preferably 1.50 or lower, and more preferably 1.30 or lower.

Therefore, compared to the complex oxide of which a stoichiometric composition is represented by a general formula of $A_3B_1C_4O_{15}$, the above-mentioned complex oxide is a complex oxide which contains excessive amounts of "A" and "B" in a predetermined proportion with respect to "C". By setting "a" and "b" within the above ranges, the above complex oxide can exhibit high resistivity even when fired in a reducing atmosphere. As described later, by firing in a reducing atmosphere, the ratio of "B" in the M2 sites and the integrated intensity ratio can be easily set within the above ranges.

Following is speculated as an example of a reason in which the complex oxide exhibiting a high resistivity is obtained by setting "a" and "b" within the above ranges. When the complex oxide represented by the general formula $A_3B_1C_4O_{15}$ is fired in a reducing atmosphere, oxygen is taken out of the complex oxide, and oxygen defects and free electrons are generated in pairs. As a result, it is considered that conductivity due to movement of the generated free electrons is generated, and the resistivity of the complex oxide is lowered.

Here, "A" and "B" are excessively present with respect to "C", and thereby, the ratio of B is increased in the sites (the M1 sites and the M2 sites) occupied by "B" and "C". In other words, it is considered that "B" substitutes "C". As described above, since "B" is a tetravalent element and "C" is a pentavalent element, if "B" substitutes "C", a valence balance between the element and oxygen is broken, and although oxygen defects are generated, free electrons are not generated. As a result, in the complex oxide, the oxygen defects are present to some extent, and thus a reaction for generating the oxygen defects accompanying reduction firing is difficult to proceed. That is, even in a reducing atmosphere, the reaction in which oxygen is taken out of the complex oxide is difficult to occur. Accordingly, the free electrons are not easily generated, and thus it is considered that the decrease in the resistivity is suppressed.

Moreover, in the complex oxide, an oxygen amount (O) may change according on the composition ratio of "A", "B", and "C", the oxygen defects, and the like. Therefore, in the embodiment, a deviation amount of the oxygen from the stoichiometric ratio is represented by "α", based on the stoichiometric ratio in the complex oxide represented by the general formula $A_3B_1C_4O_{15}$. The range of "α" is not particularly limited, and is, for example, about −1 or higher and 1 or lower.

In the embodiment, "A" includes at least barium and may also include divalent elements A1 other than barium. "A1" preferably includes one or more elements selected from the group consisting of calcium and strontium. When "A1" is included in "A" in addition to barium, the complex oxide according to the embodiment can be expressed as $(Ba_{1-x}A1_x)_aB_bC_4O_{15+\alpha}$. In the formula, "x" is preferably 0.00 or higher. On the other hand, "x" is preferably 0.50 or lower, and more preferably 0.25 or lower. Even if "A1" is included in "A", suitable dielectric characteristics can be obtained.

In addition, "B" includes at least zirconium and may also include tetravalent elements B1 other than zirconium. "B1" preferably includes titanium. When "B1" is included in "B" in addition to zirconium, the complex oxide according to the embodiment can be expressed as $A_a(Zr_{1-y}B1_y)_bC_4O_{15+\alpha}$. In the formula, "y" is preferably 0.00 or higher. On the other hand, "y" is preferably 0.50 or lower, and more preferably 0.25 or lower. Even if "B1" is included in "B", suitable dielectric characteristics can be obtained.

Moreover, when titanium is included as "B1", the resistivity tends to decrease. Therefore, in the embodiment, it is preferable that titanium is included to an extent that the effects of the present invention can be obtained. Specifically, when the total number of atoms configuring "B" is set to 1, the proportion of the number of titanium atoms is preferably 0.25 or lower, and more preferably 0.125 or lower. From the viewpoint of obtaining high resistivity, it is preferable that the complex oxide is substantially free of titanium. Here, "substantially free of titanium" means that titanium may be contained as long as it is in an amount due to inevitable impurities.

In addition, "C" includes at least niobium and may also include pentavalent elements C1 other than niobium. "C1" preferably includes tantalum. When "C1" is included in "C" in addition to niobium, the complex oxide according to the embodiment can be expressed as $A_aB_b(Nb_{1-z}C1_z)_4O_{15+\alpha}$. In the formula, "z" is preferably 0.00 or higher. On the other hand, "z" is preferably 0.50 or lower, and more preferably 0.25 or lower. Even if "C1" is included in "C", suitable dielectric characteristics can be obtained.

Moreover, when the total number of atoms configuring "A" is set to 1, the proportion of the number of atoms of the divalent elements A1 other than calcium and strontium is preferably 0.10 or lower. When the total number of atoms configuring "B" is set to 1, the proportion of the number of atoms of the tetravalent elements B1 other than titanium is preferably 0.10 or lower. When the total number of atoms configuring "C" is set to 1, the proportion of the number of atoms of the pentavalent elements C1 other than tantalum is preferably 0.10 or lower.

As described above, the general formula $A_aB_bC_4O_{15+\alpha}$ can be represented by $(Ba_{1-x}A1_x)_a(Zr_{1-y}B1_y)_b(Nb_{1-z}C1_z)_4O_{15+\alpha}$. "a", "b", "x", "y", "z" and "α" are in the above-mentioned ranges.

Further, the dielectric composition according to the embodiment may include other components in addition to the above-described complex oxide within the range where the effects of the present invention are exhibited. The content of the other components is preferably 20 mass % or less and more preferably 10 mass % or less in 100 mass % of the dielectric composition. Particularly, the content of one or more components selected from the group consisting of $SiO_2$, $MnO$, $CuO$, $Fe_2O_3$ and $Bi_2O_3$ is preferably 0.5 mass % or less in total in 100 mass % of the dielectric composition. This is because these components reduce sinterability of the dielectric composition and thus the dielectric characteristics and physical characteristics of the dielectric composition deteriorate.

3. Manufacturing Method of Multilayer Ceramic Capacitor

Next, an example of the manufacturing method of the multilayer ceramic capacitor 1 shown in FIG. 1 is described below.

The multilayer ceramic capacitor 1 according to the embodiment can be manufactured by a known method similar to a conventional multilayer ceramic capacitor. As a known method, for example, a method is exemplified in which a multilayer ceramic capacitor is manufactured in a manner that a green chip is produced using a paste containing a raw material of a dielectric composition and the green chip is fired. The manufacturing method is specifically described below.

First, starting materials for the dielectric composition are prepared. The complex oxide configuring the above dielectric composition can be used as the starting material. In addition, oxides of respective metals included in the complex oxide can be used. In addition, various compounds which become the components configuring the complex oxide by firing can be used. The various compounds may be, for example, carbonates, oxalates, nitrates, hydroxides, organometallic compounds, and the like. In the embodiment, the starting raw material is preferably powder.

Among the prepared starting raw materials, the raw materials of the complex oxide are weighed to a predetermined proportion, and then are wet mixed for a predetermined time using a ball mill or the like. After the mixed powder is dried, heat treatment is performed in a range of 700 to 1300° C. in the air to obtain a calcinated powder of the complex oxide.

Subsequently, the paste for producing the green chip is prepared. The obtained calcinated powder, a binder, and a solvent are kneaded to prepare a dielectric layer paste. The binder and the solvent may be known binder and solvent. In addition, the dielectric layer paste may include additives such as a plasticizer, a dispersant and the like as necessary.

An internal electrode layer paste is obtained by kneading the above-described raw material of the conductive material, a binder, and a solvent. The binder and the solvent may be known binder and solvent. The internal electrode layer paste may include additives such as a inhibitor, a plasticizer and the like as necessary.

An external electrode paste can be prepared the same as the internal electrode layer paste.

A green sheet and an internal electrode pattern are formed using each obtained paste and are stacked to obtain the green chip.

A binder removal treatment is performed on the obtained green chip as necessary. Conditions of the binder removal treatment may be known conditions, for example, a holding temperature is preferably 200 to 350° C.

After the binder removal treatment, the green chip is fired to obtain the element body. In the embodiment, the firing in a reducing atmosphere (the reduction firing) is performed to achieve the ratio of "B" in the M2 sites and the integrated intensity ratio within the above ranges. An oxygen partial pressure ($pO_2$) in the reducing atmosphere is preferably $1 \times 10^{-7}$ Pa or lower, and more preferably $1 \times 10^{-8}$ Pa or lower. Other firing conditions may be known conditions, for example, a holding temperature is preferably 1200 to 1450° C.

After the firing, a reoxidation treatment (annealing) is preferably performed on the obtained element body. Annealing conditions may be known conditions, for example, an oxygen partial pressure during the annealing is preferably higher than the oxygen partial pressure during the firing, and a holding temperature is preferably 1150° C. or lower. Particularly, as the oxygen partial pressure in the reducing atmosphere during the firing is closer to 0, more oxygen defects are generated in the dielectric composition, and thus the annealing time is preferably increased in order to compensate for the oxygen defects.

The dielectric composition configuring the dielectric layers of the element body obtained as described above is the above-described dielectric composition. End surface polishing is performed on the element body, and the external electrode paste is coated and baked to form the external electrode 4. Then, a coating layer is formed as necessary on a surface of the external electrode 4 by plating or the like.

In this way, the multilayer ceramic capacitor according to the embodiment is manufactured.

4. Summary of the Embodiment

The inventor found that, when the tetravalent element "B" and the pentavalent element "C" included in the complex oxide having the tungsten bronze structure occupy the M1 sites and the M2 sites of the tungsten bronze structure, the higher the proportion of "B" located in the M2 sites, the more the dielectric characteristics, particularly, the relative permittivity improved.

It is considered that the reason is that the dielectric characteristics due to the structural distortion of the oxygen octahedron including "C" located in the M1 sites are larger when "C" is located in the M1 sites.

In addition, the inventor focused on the X-ray diffraction peak of the (410) plane of the tungsten bronze structure, and found that the peak is splitted into two and the larger the area of the high-angle side peak, the more the dielectric characteristics, particularly, the relative permittivity improved.

Furthermore, the inventor found that the proportion of "B" located in the M2 sites correlates with the area of the high-angle side peak of the X-ray diffraction peak of the (410) plane. As a result, the proportion of "B" located in the M2 sites and the area of the high-angle side peak satisfy the above-described relationship.

In order to obtain this effect, it is necessary to fire the dielectric composition in a reducing atmosphere. Therefore, the dielectric composition according to the embodiment includes the divalent element "A" and the tetravalent element "B" in excess with respect to the pentavalent element "C", thereby giving reduction resistance to the dielectric composition. As a result, the dielectric composition having an improved relative permittivity while maintaining the resistivity can be obtained.

5. Modification Example

In the embodiment described above, the case in which the electronic component according to the present invention is a multilayer ceramic capacitor is described; however, the electronic component according to the present invention is not limited to the multilayer ceramic capacitor, and may be any electronic component having the above-described dielectric composition.

In the above, the embodiment of the present invention is described, but the present invention is not limited to the above embodiment at all, and may be changed in various aspects within the scope of the present invention.

Examples

The present invention is described below more specifically with reference to examples and comparative examples. However, the present invention is not limited to the following examples.

(Experiment 1)

First, powders of barium carbonate ($BaCO_3$), calcium carbonate ($CaCO_3$), strontium carbonate ($SrCO_3$), zirconium oxide ($ZrO_2$), titanium oxide ($TiO_2$), niobium oxide ($Nb_2O_5$) and tantalum oxide ($Ta_2O_5$) were prepared as the starting raw materials of the complex oxide which is the main component of the dielectric composition. The prepared starting raw materials were weighed so that the fired dielectric composition had the composition shown in Table 2.

Next, weighed powders were wet mixed with a ball mill for 16 hours using ion-exchanged water as a dispersant, and the mixture was dried to obtain mixed raw material powder. Thereafter, the obtained mixed raw material powder was heat-treated in air atmosphere under conditions of a holding temperature of 900° C. and a holding time of 2 hours, and the calcinated powder of the complex oxide was obtained.

The obtained calcinated powder was wet-pulverized by a ball mill for 16 hours using ion-exchanged water as a dispersant, and the pulverized product was dried.

10 mass % of an aqueous solution including 6 mass % of a polyvinyl alcohol resin as a binder was added to 100 mass % of the pulverized calcinated powder and granulated to obtain granulated powder.

The obtained granulated powder was put into a mold of φ 12 mm, temporarily press-molded at a pressure of 0.6 ton/cm², and was further press-molded at a pressure of 1.2 ton/cm² to obtain a disk-shaped green molded body.

The obtained green molded body is fired under a reducing atmosphere. Firing conditions were a temperature rising rate of 200° C./h, a holding temperature of 1375° C., and a holding time of 2 hours. For samples with a sample number ending in "a", a mixed gas of nitrogen and hydrogen (hydrogen concentration 3%) humidified to a dew point of 20° C. was selected as the atmosphere gas, and for samples with a sample number ending in "b", a mixed gas of nitrogen and hydrogen (hydrogen concentration 3%) was selected as the atmosphere gas.

After firing, an annealing treatment was performed to obtain a sintered body. The annealing treatment condition was a holding temperature of 1050° C. The atmosphere gas was nitrogen gas humidified to a dew point of 20° C. For the samples with the sample number ending in "a", the holding time was 2 hours, and for the samples with the sample number ending in "b", the holding time was 50 hours.

The obtained sintered body was pulverized to obtain powder of the sintered body. X-ray diffraction measurement was performed on the obtained powder to obtain an X-ray diffraction chart including the X-ray diffraction peak of the (410) plane. In the X-ray diffraction measurement, Cu—Kα ray was used as the X-ray source and measurement conditions were a voltage of 45 kV, a current of 40 mA, and a scanning speed of 3 deg/min.

For the obtained X-ray diffraction peak of the (410) plan as a sum of two Voigt functions, fitting was performed to minimize the least square error of the experimental data. The calculation was performed using the R language. The Voigt functions were calculated using Voigt function of a Rcpp-Faddeeva package of R language. Parameters of the Voigt function of the RcppFaddeeva package of R language include a peak location x0, a Gaussian function parameter sigma, and a Lorentz function parameter gamma, and three numerical parameters of the Voigt functions can be set.

The respective three parameters for the two Voigt functions and the magnification of each Voigt function were set, and the sum of these Voigt functions was defined. The parameters and the magnification of each Voigt function were optimized to minimize the square error of the sum of the two Voigt functions and the experimental data. If the peak intensity was set to y, the sum of the two Voigt functions was expressed as y=A1*Voigt(x, x01, sigma1, gamma1)+A2*Voigt(x, x02, simga2, gamma2) using the parameters, and thus the sum of the two Voigt functions was fitted to the experimental data of the obtained diffraction peak.

Initial values of the parameters were set from the shape of the graph so that the experimental data became closer to the sum of the two Voigt functions. For optimization from the initial values, fitting was performed using BFGS algorithm of an optim function of R language.

Of the two Voigt functions after the fitting, the Voigt function having a peak on the low-angle side was defined as the low-angle side peak, and the Voigt function having a peak on the high-angle side was defined as the high-angle side peak. An integrated intensity ratio (the integrated intensity of the high-angle side peak/the integrated intensity of the low-angle side peak) was calculated from the low-angle side peak and the high-angle side peak. The results are shown in Table 2. In addition, the ratio of "B" in the M2 sites was calculated by doubling the obtained integrated intensity ratio. The results are shown in Table 2.

Also, a disc-shaped ceramic capacitor sample was obtained by coating an In—Ga alloy to both main surfaces of the obtained sintered body to form a pair of electrodes.

The insulation resistance of the capacitor sample was measured using a digital resistance meter (R8340 manufactured by ADVANTEST Corporation) at a reference temperature (25° C.). The resistivity was calculated from the obtained insulation resistance, the effective electrode area, and the thickness of the dielectric layer. A higher resistivity was preferable, and in the Examples, a sample having a resistivity of $1.0 \times 10^6$ (Ω·m) or higher was judged to be good. The results are shown in Table 2.

Note that, it is clear that a sample having a resistivity of lower than $1.0 \times 10^4$ (Ω·m) cannot obtain sufficient dielectric characteristics, and thus the following measurement of the relative permittivity and tan δ were not performed.

For a sample having a resistivity of $1.0 \times 10^8$ (Ω·m) or higher, a signal with a frequency of 1 kHz and an input signal level (measurement voltage) of 1 Vrms was input using a digital LCR meter (4284A manufactured by YHP Corporation) at room temperature (20° C.), and the capacitance and tan δ were measured. Then, the relative permittivity (without unit) was calculated based on the thickness of the dielectric layer, the effective electrode area, and the capacitance obtained by the measurement. A higher relative permittivity was preferable, and in the Examples, a sample having a relative permittivity of 100 or higher was judged to be good. The results are shown in Table 2.

Note that, the relative permittivity of samples having a resistivity higher than $1.0 \times 10^4$ (Ω·m) and lower than $1.0 \times 10^8$ (Ω·m) was calculated based on the capacitance measured at a frequency of 1 MHz. The reason was that measurement values of the capacitance of these samples measured at the frequency of 1 kHz were strongly influenced by low resistance of the samples and lack reliability. Similarly, tan δ of the samples having a resistivity higher than $1.0 \times 10^4$ (Ω·m) and lower than $1.0 \times 10^8$ (Ω·m) were also measurement values at the frequency of 1 MHz.

TABLE 2

| Sample number | Complex oxide $(Ba_{1.00-x}A1_x)_a(Zr_{1.00-y}B1_y)_b(Nb_{1.00-z}C1_z)_4O_{15+\alpha}$ | | | | | Manufacturing condition Firing atmosphere | Annealing time | Structure Integrated intensity ratio | Ratio of B in M2 site | Characteristic Resistivity [Ω·m] | Relative permittivity | tan δ [%] | Measurement frequency |
|---|---|---|---|---|---|---|---|---|---|---|---|---|---|
| | a | b | x | y | z | | | | | | | | |
| 1a | 3.12 | 1.28 | 0.00 | 0.00 | 0.00 | Nitrogen/hydrogen, H3%, dew point 20° C. | 2 h | 0.119 | 0.238 | 1.5E+10 | 483 | 0.7% | 1 kHz |

TABLE 2-continued

| Sample number | Complex oxide $(Ba_{100-x}A1_x)_a(Zr_{100-y}B1_y)_b(Nb_{100-z}C1_z)_4O_{15+\alpha}$ | | | | | Manufacturing condition | | Structure | | Characteristic | | | Measurement frequency |
|---|---|---|---|---|---|---|---|---|---|---|---|---|---|
| | a | b | x | y | z | Firing atmosphere | Annealing time | Integrated intensity ratio | Ratio of B in M2 site | Resistivity [Ωm] | Relative permittivity | tan δ [%] | |
| 1b | 3.12 | 1.28 | 0.00 | 0.00 | 0.00 | Nitrogen/hydrogen, H3%, no humidification | 50 h | 0.226 | 0.452 | 1.6E+10 | 631 | 0.7% | 1 kHz |
| 2a | 3.10 | 1.10 | 0.00 | 0.00 | 0.00 | Nitrogen/hydrogen, H3%, dew point 20° C. | 2 h | 0.120 | 0.240 | 3.2E+11 | 481 | 0.7% | 1 kHz |
| 2b | 3.10 | 1.10 | 0.00 | 0.00 | 0.00 | Nitrogen/hydrogen, H3%, no humidification | 50 h | 0.260 | 0.520 | 3.2E+11 | 577 | 0.7% | 1 kHz |
| 3a | 3.20 | 1.10 | 0.00 | 0.00 | 0.00 | Nitrogen/hydrogen, H3%, dew point 20° C. | 2 h | 0.113 | 0.226 | 6.9E+10 | 429 | 3.9% | 1 kHz |
| 3b | 3.20 | 1.10 | 0.00 | 0.00 | 0.00 | Nitrogen/hydrogen, H3%, no humidification | 50 h | 0.251 | 0.502 | 8.4E+10 | 597 | 4.8% | 1 kHz |
| 4a | 3.30 | 1.10 | 0.00 | 0.00 | 0.00 | Nitrogen/hydrogen, H3%, dew point 20° C. | 2 h | 0.107 | 0.214 | 1.9E+10 | 387 | 8.5% | 1 kHz |
| 4b | 3.30 | 1.10 | 0.00 | 0.00 | 0.00 | Nitrogen/hydrogen, H3%, no humidification | 50 h | 0.284 | 0.568 | 2.3E+10 | 478 | 10.1% | 1 kHz |
| 5a | 3.10 | 1.20 | 0.00 | 0.00 | 0.00 | Nitrogen/hydrogen, H3%, dew point 20° C. | 2 h | 0.121 | 0.242 | 2.1E+12 | 371 | 0.1% | 1 kHz |
| 5b | 3.10 | 1.20 | 0.00 | 0.00 | 0.00 | Nitrogen/hydrogen, H3%, no humidification | 50 h | 0.275 | 0.551 | 2.2E+12 | 457 | 0.1% | 1 kHz |
| 6a | 3.20 | 1.20 | 0.00 | 0.00 | 0.00 | Nitrogen/hydrogen, H3%, dew point 20° C. | 2 h | 0.105 | 0.210 | 4.9E+11 | 301 | 0.2% | 1 kHz |
| 6b | 3.20 | 1.20 | 0.00 | 0.00 | 0.00 | Nitrogen/hydrogen, H3%, no humidification | 50 h | 0.211 | 0.422 | 4.4E+11 | 384 | 0.2% | 1 kHz |
| 7a | 3.30 | 1.20 | 0.00 | 0.00 | 0.00 | Nitrogen/hydrogen, H3%, dew point 20° C. | 2 h | 0.118 | 0.235 | 2.7E+11 | 289 | 0.7% | 1 kHz |
| 7b | 3.30 | 1.20 | 0.00 | 0.00 | 0.00 | Nitrogen/hydrogen, H3%, no humidification | 50 h | 0.210 | 0.420 | 3.3E+11 | 392 | 0.7% | 1 kHz |
| 8a | 3.10 | 1.30 | 0.00 | 0.00 | 0.00 | Nitrogen/hydrogen, H3%, dew point 20° C. | 2 h | 0.119 | 0.239 | 1.4E+12 | 387 | 0.1% | 1 kHz |
| 8b | 3.10 | 1.30 | 0.00 | 0.00 | 0.00 | Nitrogen/hydrogen, H3%, no humidification | 50 h | 0.263 | 0.527 | 1.3E+12 | 520 | 0.1% | 1 kHz |
| 9a | 3.20 | 1.30 | 0.00 | 0.00 | 0.00 | Nitrogen/hydrogen, H3%, dew point 20° C. | 2 h | 0.120 | 0.239 | 4.0E+12 | 274 | 0.4% | 1 kHz |
| 9b | 3.20 | 1.30 | 0.00 | 0.00 | 0.00 | Nitrogen/hydrogen, H3%, no humidification | 50 h | 0.245 | 0.491 | 4.4E+12 | 372 | 0.5% | 1 kHz |

TABLE 2-continued

| | Complex oxide $(Ba_{1.00-x}A1_x)_a(Zr_{1.00-y}B1_y)_b(Nb_{1.00-z}C1_z)_4O_{15+\alpha}$ | | | | | Manufacturing condition | | Structure | | Characteristic | | | |
|---|---|---|---|---|---|---|---|---|---|---|---|---|---|
| Sample number | a | b | x | y | z | Firing atmosphere | Annealing time | Integrated intensity ratio | Ratio of B in M2 site | Resistivity [Ωm] | Relative permittivity | tan δ [%] | Measurement frequency |
| 10a | 3.30 | 1.30 | 0.00 | 0.00 | 0.00 | Nitrogen/hydrogen, H3%, dew point 20° C. | 2 h | 0.116 | 0.233 | 1.9E+11 | 297 | 2.4% | 1 kHz |
| 10b | 3.30 | 1.30 | 0.00 | 0.00 | 0.00 | Nitrogen/hydrogen, H3%, no humidification | 50 h | 0.202 | 0.404 | 2.1E+11 | 399 | 3.0% | 1 kHz |
| 11a | 3.05 | 1.01 | 0.00 | 0.00 | 0.00 | Nitrogen/hydrogen, H3%, dew point 20° C. | 2 h | 0.120 | 0.241 | 7.7E+06 | 887 | 35.7% | 1 MHz |
| 11b | 3.05 | 1.01 | 0.00 | 0.00 | 0.00 | Nitrogen/hydrogen, H3%, no humidification | 50 h | 0.264 | 0.527 | 8.8E+06 | 980 | 40.5% | 1 MHz |
| 12a | 3.10 | 1.01 | 0.00 | 0.00 | 0.00 | Nitrogen/hydrogen, H3%, dew point 20° C. | 2 h | 0.106 | 0.213 | 1.9E+07 | 764 | 21.4% | 1 MHz |
| 12b | 3.10 | 1.01 | 0.00 | 0.00 | 0.00 | Nitrogen/hydrogen, H3%, no humidification | 50 h | 0.207 | 0.415 | 2.2E+07 | 1030 | 15.6% | 1 MHz |
| 13a | 3.05 | 1.05 | 0.00 | 0.00 | 0.00 | Nitrogen/hydrogen, H3%, dew point 20° C. | 2 h | 0.112 | 0.223 | 9.3E+06 | 768 | 42.2% | 1 MHz |
| 13b | 3.05 | 1.05 | 0.00 | 0.00 | 0.00 | Nitrogen/hydrogen, H3%, no humidification | 50 h | 0.299 | 0.598 | 6.9E+06 | 1020 | 44.1% | 1 MHz |
| 14a | 3.10 | 1.05 | 0.00 | 0.00 | 0.00 | Nitrogen/hydrogen, H3%, dew point 20° C. | 2 h | 0.110 | 0.219 | 1.3E+11 | 519 | 0.5% | 1 kHz |
| 14b | 3.10 | 1.05 | 0.00 | 0.00 | 0.00 | Nitrogen/hydrogen, H3%, no humidification | 50 h | 0.255 | 0.511 | 1.1E+11 | 629 | 0.5% | 1 kHz |
| 15a | 3.05 | 1.10 | 0.00 | 0.00 | 0.00 | Nitrogen/hydrogen, H3%, dew point 20° C. | 2 h | 0.115 | 0.231 | 7.7E+06 | 840 | 56.7% | 1 MHz |
| 15b | 3.05 | 1.10 | 0.00 | 0.00 | 0.00 | Nitrogen/hydrogen, H3%, no humidification | 50 h | 0.221 | 0.442 | 7.2E+06 | 1116 | 47.7% | 1 MHz |
| 16a | 3.10 | 1.10 | 0.00 | 0.00 | 0.00 | Nitrogen/hydrogen, H3%, dew point 20° C. | 2 h | 0.110 | 0.220 | 2.0E+12 | 463 | 0.2% | 1 kHz |
| 16b | 3.10 | 1.10 | 0.00 | 0.00 | 0.00 | Nitrogen/hydrogen, H3%, no humidification | 50 h | 0.203 | 0.407 | 2.3E+12 | 614 | 0.1% | 1 kHz |

"aE + b" shown in the "Resistivity" column indicates "a × $10^b$".

From Table 2, it was confirmed that for the samples of which the ratio of "B" in the M2 sites and the integrated intensity ratio were within the above-described ranges, compared with the samples of which the ratio of "B" in the M2 sites and the integrated intensity ratio fall out of the above-described range, the resistivity was about the same and the relative permittivity is improved.

(Experiment 2)

A sintered body and capacitor samples were produced by the same method as in Experiment 1 except that the prepared starting raw materials were weighed so that the fired dielectric composition had the composition shown in Table 3. In addition, the same evaluation as in Experiment 1 was performed on the produced sintered body and the capacitor samples. The results are shown in Table 3.

TABLE 3

| | Complex oxide $(Ba_{1.00-x}A1_x)_a(Zr_{1.00-y}B1_y)_b(Nb_{1.00-z}C1_z)_4O_{15+\alpha}$ | | | | | | | Manufacturing condition | | Structure | | Characteristic | | |
|---|---|---|---|---|---|---|---|---|---|---|---|---|---|---|
| | | A1 | | | B1 | | C1 | | Anneal- | Integrated | Ratio | Resis- | Relative | |
| Sample number | a | Element | x | b | Element | y | Element | z | Firing atmosphere | ing time | intensity ratio | of B in M2 site | tivity [Ωm] | permittivity | tan δ [%] |
| 1a | 3.12 | — | 0.00 | 1.28 | — | 0.00 | — | 0.00 | Nitrogen/hydrogen, H3%, dew point 20° C. | 2 h | 0.119 | 0.238 | 1.5E+10 | 483 | 0.7% |
| 1b | 3.12 | — | 0.00 | 1.28 | — | 0.00 | — | 0.00 | Nitrogen/hydrogen, H3%, no humidification | 50 h | 0.226 | 0.452 | 1.6E+10 | 631 | 0.7% |
| 21a | 3.12 | Ca | 0.25 | 1.28 | — | 0.00 | — | 0.00 | Nitrogen/hydrogen, H3%, dew point 20° C. | 2 h | 0.116 | 0.232 | 1.1E+12 | 383 | 0.1% |
| 21b | 3.12 | Ca | 0.25 | 1.28 | — | 0.00 | — | 0.00 | Nitrogen/hydrogen, H3%, no humidification | 50 h | 0.215 | 0.430 | 1.1E+12 | 476 | 0.1% |
| 22a | 3.12 | Sr | 0.25 | 1.28 | — | 0.00 | — | 0.00 | Nitrogen/hydrogen, H3%, dew point 20° C. | 2 h | 0.114 | 0.228 | 1.2E+12 | 401 | 0.1% |
| 22b | 3.12 | Sr | 0.25 | 1.28 | — | 0.00 | — | 0.00 | Nitrogen/hydrogen, H3%, no humidification | 50 h | 0.234 | 0.468 | 1.3E+12 | 518 | 0.1% |
| 23a | 3.12 | Sr | 0.50 | 1.28 | — | 0.00 | — | 0.00 | Nitrogen/hydrogen, H3%, dew point 20° C. | 2 h | 0.101 | 0.203 | 5.2E+09 | 525 | 2.4% |
| 23b | 3.12 | Sr | 0.50 | 1.28 | — | 0.00 | — | 0.00 | Nitrogen/hydrogen, H3%, no humidification | 50 h | 0.206 | 0.412 | 4.3E+09 | 699 | 2.4% |
| 24a | 3.12 | — | 0.00 | 1.28 | Ti | 0.0625 | — | 0.00 | Nitrogen/hydrogen, H3%, dew point 20° C. | 2 h | 0.112 | 0.224 | 1.0E+08 | 369 | 10.1% |
| 24b | 3.12 | — | 0.00 | 1.28 | Ti | 0.0625 | — | 0.00 | Nitrogen/hydrogen, H3%, no humidification | 50 h | 0.234 | 0.468 | 8.5E+07 | 444 | 10.9% |
| 25a | 3.12 | — | 0.00 | 1.28 | Ti | 0.125 | — | 0.00 | Nitrogen/hydrogen, H3%, dew point 20° C. | 2 h | 0.119 | 0.238 | 1.4E+08 | 352 | 10.1% |
| 25b | 3.12 | — | 0.00 | 1.28 | Ti | 0.125 | — | 0.00 | Nitrogen/hydrogen, H3%, no humidification | 50 h | 0.243 | 0.485 | 1.5E+08 | 473 | 10.1% |
| 26a | 3.12 | — | 0.00 | 1.28 | Ti | 0.25 | — | 0.00 | Nitrogen/hydrogen, H3%, dew point 20° C. | 2 h | 0.117 | 0.235 | 7.2E+07 | 335 | 12.9% |
| 26b | 3.12 | — | 0.00 | 1.28 | Ti | 0.25 | — | 0.00 | Nitrogen/hydrogen, H3%, no humidification | 50 h | 0.221 | 0.442 | 8.6E+07 | 468 | 14.1% |
| 27a | 3.12 | — | 0.00 | 1.28 | — | 0.00 | Ta | 0.25 | Nitrogen/hydrogen, H3%, dew point 20° C. | 2 h | 0.109 | 0.218 | 1.1E+10 | 256 | 0.1% |
| 27b | 3.12 | — | 0.00 | 1.28 | — | 0.00 | Ta | 0.25 | Nitrogen/hydrogen, H3%, no humidification | 50 h | 0.214 | 0.427 | 9.8E+09 | 357 | 0.1% |
| 28a | 3.12 | — | 0.00 | 1.28 | — | 0.00 | Ta | 0.50 | Nitrogen/hydrogen, H3%, dew point 20° C. | 2 h | 0.114 | 0.228 | 1.4E+08 | 177 | 0.3% |

TABLE 3-continued

| | Complex oxide $(Ba_{1.00-x}A1_x)_a(Zr_{1.00-y}B1_y)_b(Nb_{1.00-z}C1_z)_4O_{15+\alpha}$ | | | | | | | Manufacturing condition | Structure | | | Characteristic | | |
|---|---|---|---|---|---|---|---|---|---|---|---|---|---|---|
| | | A1 | | | B1 | | C1 | | | Inte- | | | | |
| Sample number | a | Element | x | b | Element | y | Element | z | Firing atmosphere | Annealing time | grated intensity ratio | Ratio of B in M2 site | Resistivity [Ωm] | Relative permittivity | tan δ [%] |
| 28b | 3.12 | — | 0.00 | 1.28 | — | 0.00 | Ta | 0.50 | Nitrogen/ hydrogen, H3%, no humidification | 50 h | 0.230 | 0.460 | 1.3E+08 | 238 | 0.4% |

"aE + b" in the "Resistivity" column indicates "a × $10^b$".

From Table 3, it was confirmed that the same results as in Table 2 were obtained even when barium, zirconium and niobium were substituted with the above-described elements in the above-described proportions.

In the Examples, a so-called single-layer ceramic capacitor was evaluated, but the same results as that of the capacitor samples of the examples was obtained for a multilayer ceramic capacitor in which dielectric layers and internal electrodes were stacked.

REFERENCE SIGNS LIST 1 multilayer ceramic capacitor
10 element body
2 dielectric layer
3 internal electrode layer
4 external electrode
P X-ray diffraction peak of (410) plane of tungsten bronze structure
P1 low-angle side peak
P2 high-angle side peak

What is claimed is:

1. A dielectric composition comprising a complex oxide represented by a formula $A_aB_bC_4O_{15+\alpha}$ as a main component, wherein
"A" comprises at least barium, "B" comprises at least zirconium, and "C" comprises at least niobium;
"a" is 3.05 or higher, and "b" is 1.01 or higher;
the complex oxide has a tungsten bronze structure where "A" occupies A1 sites and A2 sites and "B" and "C" occupy M1 sites and M2 sites; and
in the tungsten bronze structure, when the total number of atoms occupying M2 sites is set to 1, the proportion of "B" is 0.250 or higher.

2. The dielectric composition according to claim 1, wherein the proportion of "B" is 0.400 or higher.

3. A dielectric composition comprising a complex oxide represented by a formula $A_aB_bC_4O_{15+\alpha}$ as a main component, wherein
"A" comprises at least barium, "B" comprises at least zirconium, and "C" comprises at least niobium;
"a" is 3.05 or higher, and "b" is 1.01 or higher;
the complex oxide has a tungsten bronze structure where "A" occupies A1 sites and A2 sites and "B" and "C" occupy M1 sites and M2 sites; and
an X-ray diffraction peak of a (410) plane of the tungsten bronze structure is splitted into two, an integrated intensity ratio of an integrated intensity of a high-angle side peak of the X-ray diffraction peak with respect to an integrated intensity of a low-angle side peak of the X-ray diffraction peak is 0.125 or higher.

4. The dielectric composition according to claim 3, wherein the integrated intensity ratio is 0.200 or higher.

5. The dielectric composition according to claim 1, wherein the formula is represented by $(Ba_{1-x}A1_x)_a(Zr_{1-y}B1_y)_b(Nb_{1-z}C1_z)_4O_{15+\alpha}$;
"A1" comprises one or more elements selected from the group consisting of calcium and strontium, "B1" comprises titanium, and "C1" comprises tantalum; and
"x" is 0.50 or lower, "y" is 0.25 or lower, and "z" is 0.50 or lower.

6. The dielectric composition according to claim 3, wherein the formula is represented by $(Ba_{1-x}A1_x)_a(Zr_{1-y}B1_y)_b(Nb_{1-z}C1_z)_4O_{15+\alpha}$;
"A1" comprises one or more elements selected from the group consisting of calcium and strontium, "B1" comprises titanium, and "C1" comprises tantalum; and
"x" is 0.50 or lower, "y" is 0.25 or lower, and "z" is 0.50 or lower.

7. The dielectric composition according to claim 1, wherein "a" is 3.10 or higher.

8. The dielectric composition according to claim 3, wherein "a" is 3.10 or higher.

9. The dielectric composition according to claim 1, wherein "b" is 1.05 or higher.

10. The dielectric composition according to claim 3, wherein "b" is 1.05 or higher.

11. An electronic component comprising a dielectric layer containing the dielectric composition according to claim 1, and electrode layers.

12. An electronic component comprising a dielectric layer containing the dielectric composition according to claim 3, and electrode layers.

* * * * *